United States Patent [19]
Tanaka et al.

[11] Patent Number: 5,268,853
[45] Date of Patent: Dec. 7, 1993

[54] ORTHOGONAL TRANSFORMATION PROCESSOR FOR COMPRESSING INFORMATION

[75] Inventors: Masafumi Tanaka, Osaka; Kazuo Sakamoto, Kobe; Tatsuya Fujii, Nishinomiya; Ryo Fukui, Yao, all of Japan

[73] Assignee: Ricoh Company, Ltd., Tokyo, Japan

[21] Appl. No.: 616,418

[22] Filed: Nov. 21, 1990

[30] Foreign Application Priority Data

| Dec. 1, 1989 | [JP] | Japan | 1-314018 |
| Dec. 18, 1989 | [JP] | Japan | 1-328936 |
| Mar. 12, 1990 | [JP] | Japan | 2-61984 |
| Mar. 16, 1990 | [JP] | Japan | 2-67500 |
| Apr. 25, 1990 | [JP] | Japan | 2-110757 |
| Sep. 20, 1990 | [JP] | Japan | 2-253573 |

[51] Int. Cl.$^5$ .............................................. G06F 7/38
[52] U.S. Cl. ............................................................ 364/725
[58] Field of Search .................................. 364/725–726

[56] References Cited

U.S. PATENT DOCUMENTS

| 4,760,543 | 7/1988 | Ligtenberg et al. | 364/725 |
| 4,791,598 | 12/1988 | Liou et al. | 364/725 |
| 4,821,224 | 4/1989 | Liu et al. | 364/726 |
| 4,829,465 | 5/1989 | Knauer et al. | 364/725 |
| 4,849,922 | 7/1989 | Riolfo | 364/725 |
| 5,031,038 | 7/1991 | Guillemot et al. | 364/726 X |

FOREIGN PATENT DOCUMENTS

| 0245903 | 5/1987 | European Pat. Off. . |
| 0250152 | 6/1987 | European Pat. Off. . |
| 0267729 | 11/1987 | European Pat. Off. . |
| 0206847 | 8/1990 | European Pat. Off. . |
| 0254628 | 11/1990 | European Pat. Off. . |

*Primary Examiner*—Tan V. Mai
*Attorney, Agent, or Firm*—Cooper & Dunham

[57] ABSTRACT

An orthogonal transformation processor has a first one-dimensional orthogonal transformation calculator for calculating a one-dimensional orthogonal transformation; a memory device for temporarily storing an output of the first one-dimensional orthogonal transformation calculator; a second one-dimensional orthogonal transformation calculator for calculating a one-dimensional orthogonal transformation and inputting an output of the memory device thereto; and an address generator for designating an address of the memory device and replacing row and column addresses with each other in accordance with a switching operation of writing and reading operations of the memory device. Instead of this address generator, the orthogonal transformation processor may have an address generator for designating an address of the memory device and replacing row and column addresses with each other in accordance with calculating operations of the first and second one-dimensional orthogonal transformation calculators. The orthogonal transformation processor may further have a reading-writing control section for reading one data of the memory device and writing new results calculated by the first one-dimensional orthogonal transformation calculator to the same address after the data reading operation.

5 Claims, 11 Drawing Sheets

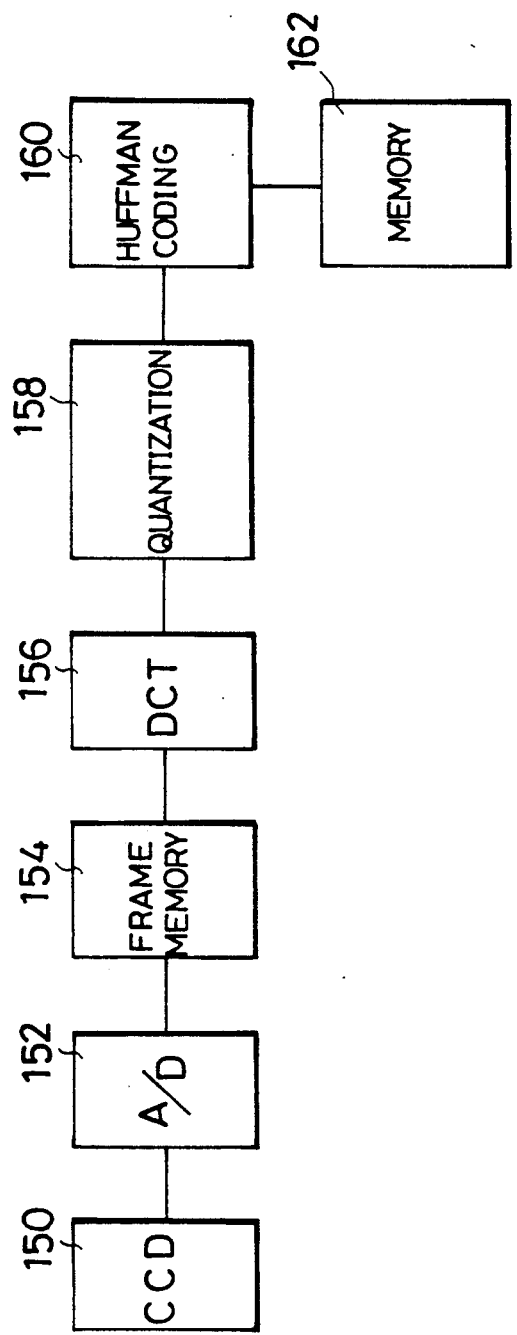
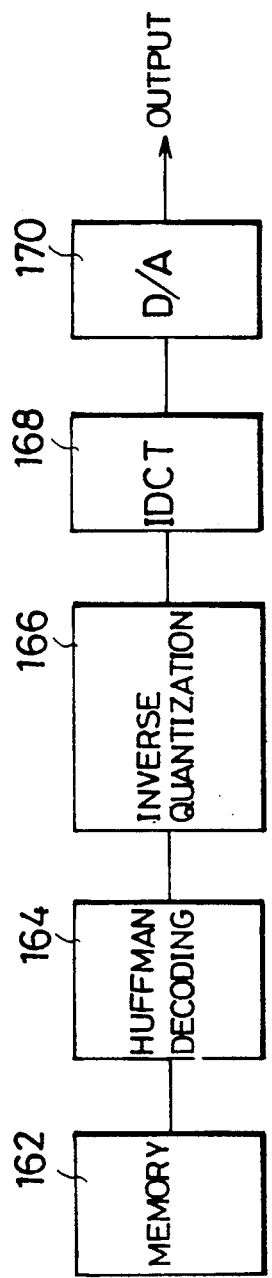

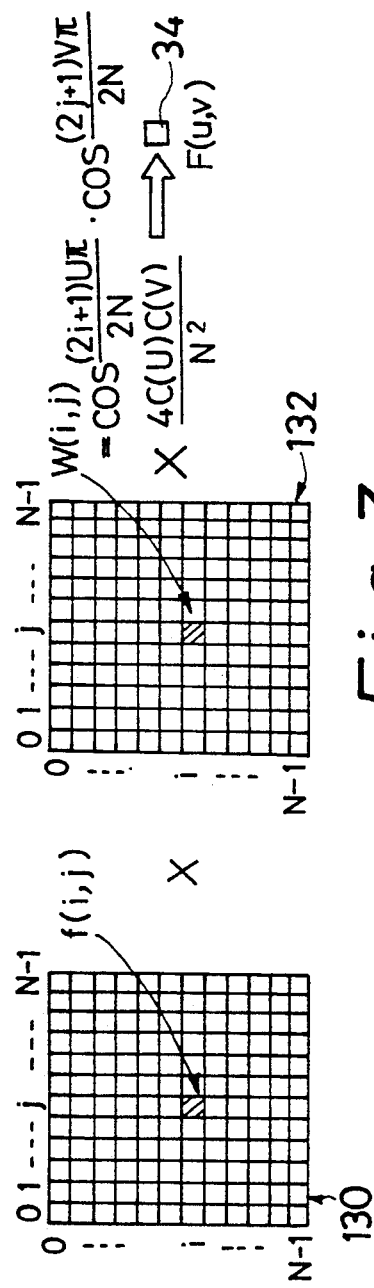
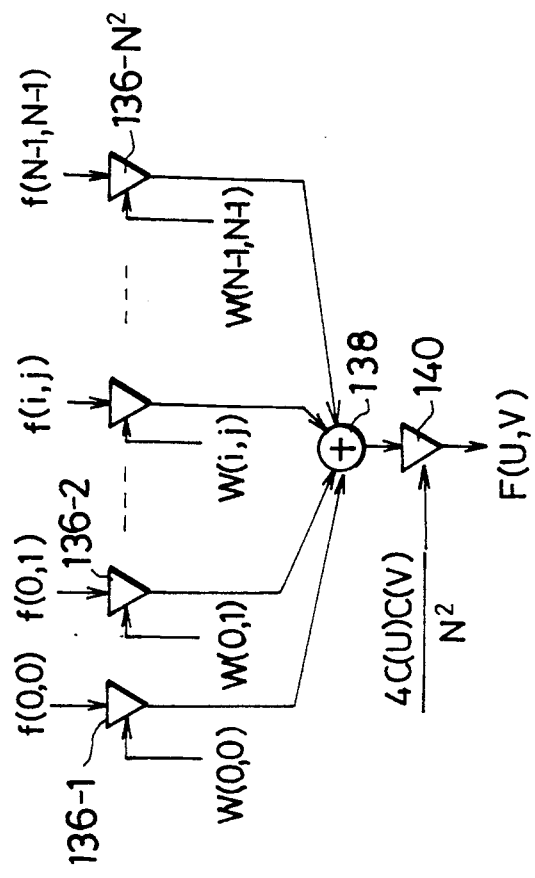

| (0,0) | (1,0) | (2,0) | (3,0) | (4,0) | (5,0) | | (N-1,0) |
|---|---|---|---|---|---|---|---|
| (0,1) | (1,1) | (2,1) | (3,1) | (4,1) | (5,1) | | (N-1,1) |
| (0,2) | (1,2) | (2,2) | | | | | (N-1,2) |
| (0,3) | | | | | | | |
| | | | | | | | |
| | | | | | | | |
| | | | | | | | |
| (0,N-1) | (1,N-1) | (2,N-1) | | | | | (N-1,N-1) |

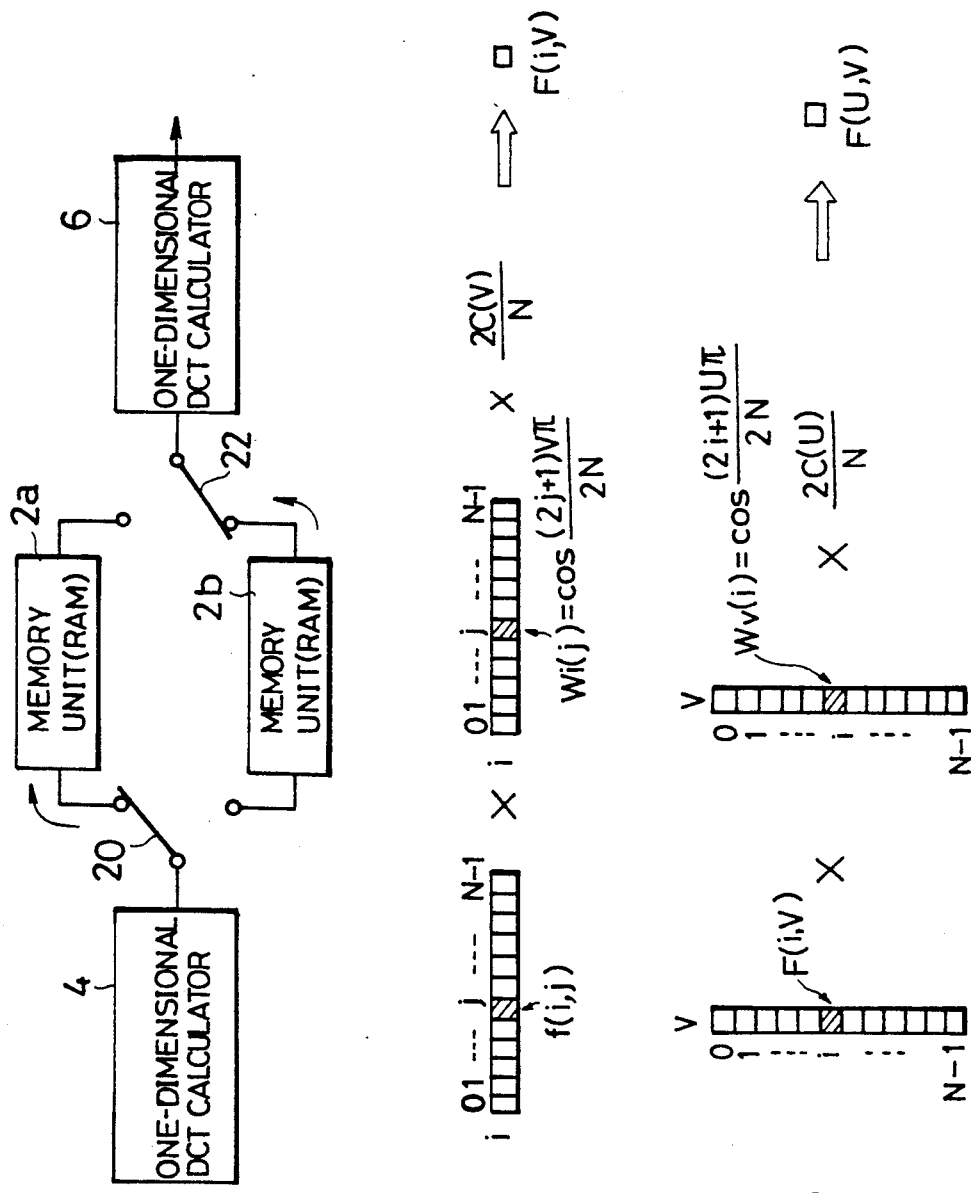

ORTHOGONAL TRANSFORMATION PROCESSOR FOR COMPRESSING INFORMATION

BACKGROUND OF THE INVENTION

1. Field of the Invention

The present invention relates to a processor used in a digital still video camera, a facsimile, a color copying machine, a visual telephone, etc. and performing an orthogonal transformation such as a discrete cosine transformation (which is called a DCT in the following description) and a discrete sine transformation (which is called a DST in the following description) for increasing and decreasing the size of a color image, etc.

2. Description of the Related Art

An orthogonal transformation such as the discrete cosine transformation and the discrete sine transformation is known in one transformation coding method for compressing information.

For example, an image is divided into blocks constructed by $(8 \times 8)$ picture elements in a one-dimensional discrete cosine transformation for compressing the image and a one-dimensional inverse discrete cosine transformation (IDCT) for extending the image. In this case, it is necessary to perform 64 multiplying operations and 56 adding operations. Therefore, processing times for performing the discrete cosine transformation and the inverse discrete cosine transformation are increased and circuits for performing these transformations are large-sized so that it is difficult to integrate these circuits.

When a discrete sine transformation instead of the discrete cosine transformation is performed as the orthogonal transformation, a processing time for performing the discrete sine transformation is similarly increased and a circuit for performing this transformation is large-sized.

When input data are constructed by n bits and the number of kinds of transformation coefficients is set to m in a ROM look-up table method, the address space of a ROM is represented by $m \times 2^n$. When the discrete cosine transformation is performed with respect to the blocks constructed by $(8 \times 8)$ picture elements, the number of kinds of the transformation coefficients is fixedly set to 8 and the input data are constructed by eight picture elements each constructed by eight bits. Accordingly, in this case, the number n of bits is equal to 64 and the address space is represented by $8 \times 2^{64}$. It is difficult to realize a circuit having such a large capacity.

SUMMARY OF THE INVENTION

It is therefore a first object of the present invention to provide an orthogonal transformation processor for simplifying the constructions of a discrete cosine transformation calculator and a discrete sine transformation calculator to integrate circuits of these calculators.

A second object of the present invention is to provide an orthogonal transformation processor for reducing the capacity of a ROM when the calculation of an orthogonal transformation such as a discrete cosine transformation is performed in a ROM look-up table method.

The above objects of the present invention can be achieved by an orthogonal transformation processor comprising a first one-dimensional orthogonal transformation calculator for calculating a one-dimensional orthogonal transformation; a memory device for temporarily storing an output of the first one-dimensional orthogonal transformation calculator; a second one-dimensional orthogonal transformation calculator for calculating a one-dimensional orthogonal transformation and inputting an output of the memory device thereto; and an address generator for designating an address of the memory device and replacing row and column addresses with each other in accordance with a switching operation of writing and reading operations of the memory device.

The above objects of the present invention can be also achieved by an orthogonal transformation processor comprising a first one-dimensional orthogonal transformation calculator for calculating a one-dimensional orthogonal transformation; a memory device for temporarily storing an output of the first one-dimensional orthogonal transformation calculator; a second one-dimensional orthogonal transformation calculator for calculating a one-dimensional orthogonal transformation and inputting an output of the memory device thereto; and an address generator for designating an address of the memory device and replacing row and column addresses with each other in accordance with calculating operations of the first and second one-dimensional orthogonal transformation calculators; and a reading-writing control section for reading one data of the memory device and writing new results calculated by the first one-dimensional orthogonal transformation calculator to the same address after the data reading operation.

The above objects of the present invention can be also achieved by an orthogonal transformation processor comprising an orthogonal transformation processing circuit for performing a discrete cosine transformation or a discrete sine transformation; a preprocessing circuit for performing adding and subtracting operations with respect to input data such that transformation coefficients are partially set to zero in an orthogonal transformation processing; and multiplying-adding means disposed in the orthogonal transformation processing circuit and performing a multiplying operation with respect to nonzero transformation coefficients and added or subtracted data provided by the preprocessing circuit, the multiplying-adding means further performing an adding operation with respect to the multiplied results.

The above objects of the present invention can be also achieved by an orthogonal transformation processor comprising an orthogonal transformation circuit for dividing one image into blocks including a plurality of picture elements and performing an orthogonal transformation processing every block using a ROM table; and an adding circuit disposed in the orthogonal transformation circuit and setting input data every one bit and transformation coefficient data of plural bits to data indicative of an address, the adding circuit performing an adding operation with respect to all the bits of the input data by shifting data read out of the ROM table in the direction of an upper or lower position in accordance with a bit position of the input data of the address.

In accordance with the above structures, the constructions of a discrete cosine transformation calculator and a discrete sine transformation calculator are simplified to integrate circuits of these calculators.

Further, the capacity of a ROM is reduced when the calculation of an orthogonal transformation such as a discrete cosine transformation is performed in a ROM look-up table method.

Further objects and advantages of the present invention will be apparent from the following description of the preferred embodiments of the present invention as illustrated in the accompanying drawings.

BRIEF DESCRIPTION OF THE DRAWINGS

FIGS. 1a and 1b are block diagrams showing systems for compressing and extending data;

FIG. 2 is a view showing the calculating processing of a general two-dimensional discrete cosine transformation;

FIG. 3 is a view showing a circuit for calculating the general two-dimensional discrete cosine transformation;

FIG. 11 is a block diagram showing an orthogonal transformation processor in a second embodiment of the present invention;

FIGS. 12a and 12b are views showing the concept of a calculating operation of the orthogonal transformation processor in the second embodiment;

DESCRIPTION OF THE PREFERRED EMBODIMENTS

Figure 4:
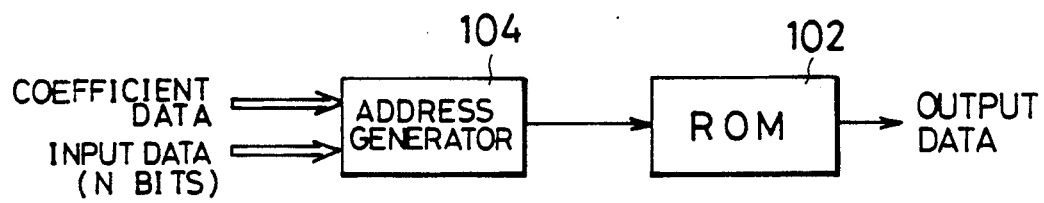
FIG. 4 is a block diagram showing the construction of one multiplier used in a general calculating system in a ROM look-up table method.

The preferred embodiments of an orthogonal transformation processor in the present invention will next be described in detail with reference to the accompanying drawings.

FIGS. 1a and 1b show an example in which data are compressed through a discrete cosine transformation processing.

In FIGS. 1a and 1b, image information is read by a CCD image sensor 150 and is converted to a digital signal by an A/D converter 152. One picture with respect to the image information is temporarily stored to a frame memory 154. A discrete cosine transformation is then performed by a DCT processing circuit 156 with respect to data of the frame memory 154 and the transformed data are quantized by a quantization circuit 158. A Huffman transformation with respect to the quantized data is then performed by a Huffman coding circuit 160 and the transformed data are stored to a memory device 162. When the data stored into the memory device 162 are used to reproduce an image, these data are decoded by a Huffman decoding circuit 164. The decoded data are then returned to image data by an IDCT circuit 168 through an inverse quantization circuit 166. These image data are converted to an analog signal by a D/A converter 170 and are outputted therefrom.

An image is divided into blocks constituted by (N×N) picture elements. A two-dimensional discrete cosine transformation is performed with respect to each of the blocks. In this case, the two-dimensional discrete cosine transformation is represented by the following formula (1).

$$F(U,V) = (2C(U)/N)(2C(V)/N) \sum_{i=0}^{N-1} \sum_{j=0}^{N-1} f(i,j)\cos((2i+1)U\pi/2N) \cdot \cos((2j+1)V\pi/2N) \quad (1)$$

When $U = 0$, $C(U) = 1/\sqrt{2}$.
When $U \neq 0$, $C(U) = 1$.

When $V = 0$, $C(V) = 1/\sqrt{2}$.
When $V \neq 0$, $C(V) = 1$.

In the above formula (1), $f(i,j)$ shows data of a picture element.

In the calculation of the two-dimensional discrete cosine transformation, the calculation of a one-dimensional discrete cosine transformation with respect to index $i$ is performed after the calculation of a one-dimensional discrete cosine transformation with respect to index $j$ has been performed. When $N=8$, a calculating formula of the one-dimensional discrete cosine transformation is transformed to a vector calculating formula as shown by the following formula (2).

$$\begin{bmatrix} Z_0 \\ Z_2 \\ Z_4 \\ Z_6 \end{bmatrix} = \begin{bmatrix} 1 & 1 & 1 & 1 & 1 & 1 & 1 & 1 \\ \beta & -\delta & -\beta & \delta & \delta & -\beta & -\delta & \beta \\ \alpha & -\alpha & \alpha & -\alpha & -\alpha & \alpha & -\alpha & \alpha \\ \delta & \beta & -\delta & -\beta & -\beta & -\delta & \beta & \delta \end{bmatrix} \begin{bmatrix} x_0 \\ x_2 \\ x_4 \\ x_6 \end{bmatrix} \quad (2)$$

$$\begin{bmatrix} Z_1 \\ Z_3 \\ Z_5 \\ Z_7 \end{bmatrix} = \begin{bmatrix} \lambda & \mu & -\nu & -\gamma & \gamma & \nu & -\mu & -\lambda \\ \gamma & -\lambda & \mu & \nu & -\nu & -\mu & \lambda & -\gamma \\ \mu & \nu & -\gamma & \lambda & -\lambda & \gamma & -\nu & -\mu \\ \nu & \gamma & \lambda & \mu & -\mu & -\lambda & -\gamma & -\nu \end{bmatrix} \begin{bmatrix} x_1 \\ x_3 \\ x_5 \\ x_7 \end{bmatrix}$$

Here,
$\alpha = \cos(2/8)\pi$
$\beta = \cos(\frac{1}{8})\pi$
$\delta = \sin(\frac{1}{8})\pi$
$\lambda = \cos(1/16)\pi$
$\mu = \sin(3/16)\pi$
$\gamma = \cos(3/16)\pi$
$\nu = \sin(1/16)\pi$ When an image compression processing is performed through the calculation of the discrete cosine transformation, the calculation of an inverse discrete cosine transformation inverse to the discrete cosine transformation is performed in an extending operation in which compressed data are returned to the original data. The inverse discrete cosine transformation (IDCT) is represented by the following formula.

$$f(i,j) = \sum_{U=0}^{N-1} \sum_{V=0}^{N-1} (2C(U)/N)(2C(V)/N)F(U,V)\cos((2i + \quad (3)$$

$$1)U\pi/2N) \cdot \cos((2j + 1)V\pi/2N)$$

When $U = 0$, $C(U) = 1/\sqrt{2}$.
When $U \neq 0$, $C(U) = 1$.

When $V = 0$, $C(V) = 1/\sqrt{2}$.
When $V \neq 0$, $C(V) = 1$.

In the calculation of a two-dimensional inverse discrete cosine transformation, the calculation of a one-dimensional inverse discrete cosine transformation with respect to index U is performed after the calculation of a one-dimensional inverse discrete cosine transformation with respect to index V has been performed. The one-dimensional inverse discrete cosine transformation is represented by a vector calculating formula as shown by the following formula (4).

$$\begin{bmatrix} x_0 \\ x_2 \\ x_4 \\ x_6 \\ x_1 \\ x_3 \\ x_5 \\ x_7 \end{bmatrix} = \begin{bmatrix} 1 & \beta & \alpha & \delta & \lambda & \gamma & \mu & \nu \\ 1 & -\delta & -\alpha & \beta & \mu & \lambda & \nu & \gamma \\ 1 & -\beta & \alpha & -\delta & -\nu & \mu & -\gamma & \lambda \\ 1 & \delta & -\alpha & -\beta & -\gamma & \nu & \lambda & \mu \\ 1 & \delta & -\alpha & -\beta & \gamma & \nu & -\lambda & -\mu \\ 1 & -\beta & \alpha & -\delta & \nu & -\mu & \gamma & -\lambda \\ 1 & -\delta & -\alpha & \beta & -\mu & \lambda & -\nu & -\gamma \\ 1 & \beta & \alpha & \delta & -\lambda & -\gamma & -\mu & -\nu \end{bmatrix} \begin{bmatrix} Z_0 \\ Z_2 \\ Z_4 \\ Z_6 \\ Z_1 \\ Z_3 \\ Z_5 \\ Z_7 \end{bmatrix} \quad (4)$$

When the vector calculating formulas (2) and (4) are calculated, it is necessary to multiply transformation coefficients by data values x and z.

As shown in FIG. 2, a two-dimensional discrete cosine transformation calculator for calculating the formula (1) performs a convolution operation in which $(N \times N)$ picture elements constituting an original image 130 are multiplied by a transformation matrix 132 having transformation coefficients w(i,j). The convoluted results are multiplied by a coefficient $4C(U)C(V)/N^2$ to obtain a transformation picture element F(U,V).

As shown in FIG. 3, when such an operation is performed, it is necessary to dispose $N^2$ multipliers 136-1 to 136-$N^2$, an adder 138 having $N^2$ bits and a multiplier 140 for multiply the added results of the adder 138 by the coefficient $4C(U)C(V)/N^2$.

There is a ROM look-up table method using a ROM table instead of a multiplier to perform a multiplying operation. For example, when a vector calculation in the formula (2) is performed, it is sufficient to prepare a ROM 102 for holding data corresponding to products of respective transformation coefficients and input data as shown in FIG. 4. Further, data indicative of the transformation coefficients and the input data are read out of the ROM 102 as addresses. In FIG. 4, reference numeral 104 designates an address generator. The transformation coefficient data and the input data are constructed by plural bits and are respectively inputted to the address generator 104.

For example, an image is divided into blocks constructed by $(8 \times 8)$ picture elements in the one-dimensional discrete cosine. transformation for compressing the image and the one-dimensional inverse discrete cosine transformation for extending the image. In this case, it is necessary to perform 64 multiplying operations and 56 adding operations. Therefore, processing times for performing the discrete cosine transformation and the inverse discrete cosine transformation are increased and circuits for performing these transformations are large-sized so that it is difficult to integrate these circuits.

When a discrete sine transformation (DST) instead of the discrete cosine transformation is performed as an orthogonal transformation, a processing time for performing the discrete sine transformation is similarly increased and a circuit for performing this transformation is large-sized.

When input data are constructed by n bits and the number of kinds of the transformation coefficients is set to m in the ROM look-up table method, an address space of the ROM 102 is represented by $m \times 2^n$. When the discrete cosine transformation is performed with respect to the blocks constructed by $(8 \times 8)$ picture elements, the number of kinds of the transformation coefficients is fixedly set to 8 and the input data are constructed by eight picture elements each constructed by eight bits. Accordingly, in this case, the number n of bits is equal to 64 and the address space is represented by $8 \times 2^{64}$. It is difficult to realize a circuit having such a large capacity.

Figure 5:
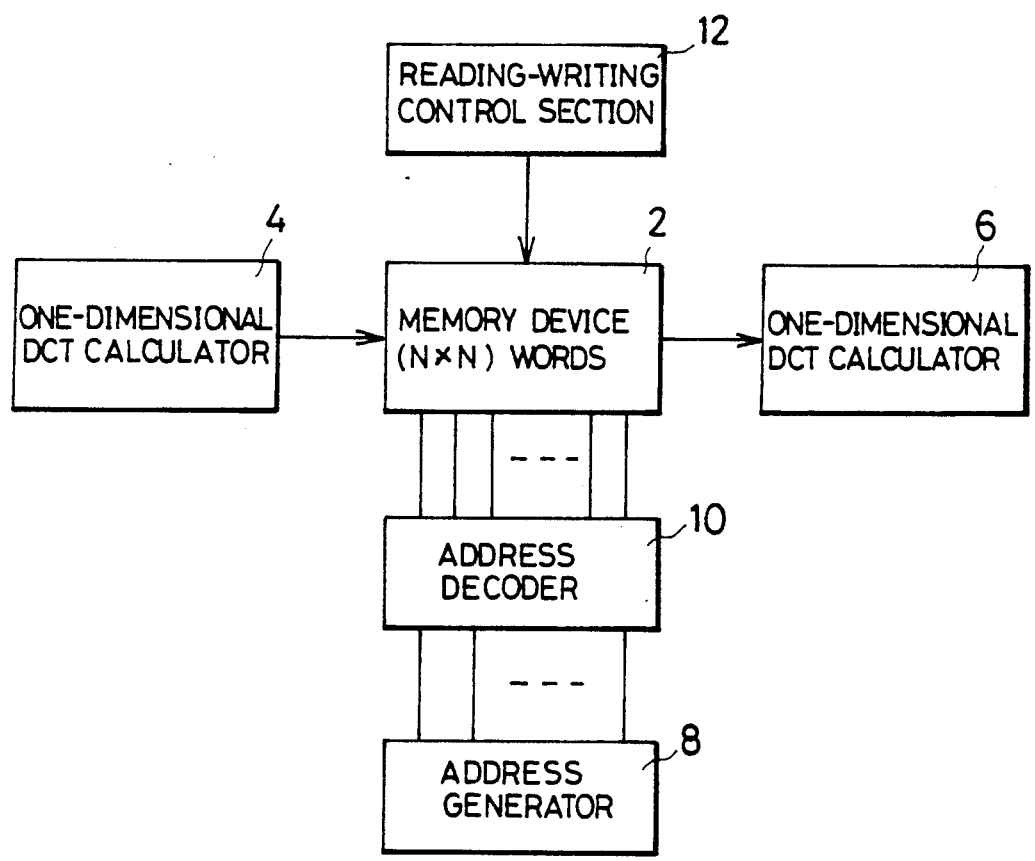
FIG. 5 is a block diagram showing an orthogonal transformation processor in a first embodiment of the present invention.

FIG. 5 shows an orthogonal transformation processor in a first embodiment of the present invention.

In FIG. 5, the orthogonal transformation processor has a first one-dimensional orthogonal transformation calculator 4 such as a one-dimensional DCT calculator, and a memory device 2 for temporarily storing an output of the first one-dimensional orthogonal transformation calculator 4. The orthogonal transformation processor further has a second one-dimensional orthogonal transformation calculator 6 such as a one-dimensional DCT calculator for inputting an output of the memory device 2 thereto. The orthogonal transformation processor further has an address generator 8 for designating an address of the memory device 2 and replacing row and column addresses with each other in accordance with a switching operation of writing and reading operations of the memory device 2. In FIG. 5, reference numerals 10 and 12 respectively designate an address decoder and a reading-writing control section.

FIG. 11 shows an orthogonal transformation processor for performing an orthogonal transformation processing at a high speed. In this orthogonal transformation processor, the memory device is constructed by a pair of memory units 2a, 2b and the first and second one-dimensional orthogonal transformation calculators 4, 6 are respectively connected to the memory units 2a, 2b through switching circuits 20, 22. The switching circuits 20 and 22 are switched such that the second one-dimensional orthogonal transformation calculator 6 is connected to one memory unit 2b (or 2a) when the first one-dimensional orthogonal transformation calculator 4 is connected to the other memory unit 2a (or 2b).

In FIG. 5, the address generator 8 may designate an address of the memory device 2 and replace row and column addresses with each other in accordance with calculating operations of the first and second one-dimensional orthogonal transformation calculators 4, 6. The reading-writing control section 12 may read one data of the memory device 2 and write new results calculated by the first one-dimensional orthogonal transformation calculator 4 to the same address after the data reading operation.

Further, an orthogonal transformation processor in the present invention may have an orthogonal transformation processing circuit for performing a discrete cosine transformation or a discrete sine transformation, and a preprocessing circuit for performing adding and subtracting operations with respect to input data such that transformation coefficients are partially set to zero in an orthogonal transformation processing. The orthogonal transformation processing circuit can perform a multiplying operation with respect to nonzero transformation coefficients and added or subtracted data provided by the preprocessing circuit and perform an adding operation with respect to the multiplied results.

Further, in the present invention, an orthogonal transformation processing can be performed in a ROM look-up table method using a ROM table, and input data every one bit and transformation coefficient data of plural bits can be set to an address. An adding operation can be performed with respect to all the bits of the input image data by shifting data read out of the ROM table in the direction of an upper or lower position in accordance with a bit position of the input data of the above address.

Further, in the present invention, the processor may comprise a preprocessing circuit disposed before an orthogonal transformation circuit for performing the orthogonal transformation processing in the ROM look-up table method. The preprocessing circuit performs adding and subtracting operations with respect to the input data such that the transformation coefficients are partially set to zero in the orthogonal transformation processing.

In the present invention, the calculation of a two-dimensional orthogonal transformation is performed by a set of one-dimensional orthogonal transformation calculators. An image is divided into blocks constructed by (N×N) picture elements and a two-dimensional discrete cosine transformation is performed with respect to each of these blocks.

The two-dimensional discrete cosine transformation is represented by the above-mentioned formula (1). The formula (1) is deformed to the following formulas (5) and (6).

$$F(U,V) = (2C(U)/N) \sum_{i=0}^{N-1} \left[ (2C(V)/N) \sum_{j=0}^{N-1} f(i,j) \cos((2j+1)V\pi/2N) \right] \cdot \cos((2i+1)U\pi/2N) \quad (5)$$

$$= (2C(U)/N) \sum_{i=0}^{N-1} F(i,V) \cdot \cos((2i+1)U\pi/2N)$$

$$F(i,V) = (2C(V)/N) \sum_{j=0}^{N-1} f(i,j) \cos((2j+1)V\pi/2N) \quad (6)$$

The formula (5) represents a one-dimensional discrete cosine transformation of F(i,V) and the formula (6) represents a one-dimensional discrete cosine transformation of f(i,j). Accordingly, in the two-dimensional discrete cosine transformation with respect to (N×N) picture elements, the calculation of the one-dimensional discrete cosine transformation represented by the formula (6) is executed with respect to rows (or columns). Subsequently, the calculation of the one-dimensional discrete cosine transformation represented by the formula (5) is executed with respect to columns (or rows). Thus, the calculated results of the two-dimensional discrete cosine transformation can be obtained.

In FIG. 5, the first one-dimensional DCT calculator 4 writes data to the memory device 2 in a row or column direction thereof. The second one-dimensional DCT calculator 6 reads the written data out of the memory device 2 in the column or row direction thereof to perform the calculation of the discrete cosine transformation.

The above description relates to data compression, but data can be extended by a similar system by changing only transformation formulas.

A two-dimensional inverse discrete cosine transformation (IDCT) for data extension is represented by the above-mentioned formula (3). The formula (3) is deformed to the following formulas (7) and (8).

$$f(i,j) = \sum_{U=0}^{N-1} (2C(U)/N) \left[ \sum_{V=0}^{N-1} (2C(V)/N)F(U,V)\cos((2j+1)V\pi/2N) \right] \cdot \cos((2i+1)U\pi/2N) \quad (7)$$

$$= \sum_{U=0}^{N-1} (2C(U)/N)f(V,i) \cdot \cos((2i+1)U\pi/2N)$$

$$f(V,i) = \sum_{V=0}^{N-1} (2C(V)/N)F(U,V)\cos((2j+1)V\pi/2N) \quad (8)$$

The formula (7) represents a one-dimensional inverse discrete cosine transformation of f(V,i) and the formula (8) represents a one-dimensional inverse discrete cosine transformation of F(U,V). Accordingly, in the two-dimensional inverse discrete cosine transformation with respect to (N×N) picture elements, the calculation of the one-dimensional inverse discrete cosine transformation represented by the formula (8) is executed with respect to rows (or columns). Subsequently, the calculation of the one-dimensional inverse discrete cosine transformation represented by the formula (7) is executed with respect to columns (or rows). Thus, the calculated results of the two-dimensional inverse discrete cosine transformation can be obtained.

Similar results can be obtained when a discrete sine transformation is used as the orthogonal transformation.

In the discrete cosine transformation constructed by (8×8) picture elements in the present invention, the number of kinds of transformation coefficients is eight and the discrete cosine transformation is calculated every one bit with respect to each of eight picture elements constituting input data. Therefore, the number n of bits is equal to 8 and a required address space is represented by $8 \times 2^8$. It is possible to provide a semiconductor integrated circuit having such an address space.

When a preprocessing using the symmetric property of a transformation coefficient matrix is performed such that portions of the transformation coefficients are zero, it is sufficient to perform the calculation of the discrete cosine transformation every one bit with respect to each of four picture elements constituting the input data. Therefore, the number n of bits is equal to 4 and a required address space is reduced to $8 \times 2^4$ so that it is further easy to provide a semiconductor integrated circuit.

A preprocessing circuit performs the following processings.

An image is divided into blocks constructed by (8×8) picture elements. A one-dimensional discrete cosine transformation is performed with respect to each of these blocks. The preprocessing circuit transforms input data $x_0, x_1, - - - x_7$ to $(x_0+x_7)$, $(x_2+x_5)$, $(x_1+x_6)$, $(x_3+x_4)$, $(x_0-x_7)$, $(x_2-x_5)$, $(x_1-x_6)$, and $(x_3-x_4)$. The following formula (9) shows a discrete cosine transformation formula using the formula (2) in which the data transformed by the preprocessing circuit are used as variables.

$$\begin{bmatrix} Z_0 \\ Z_2 \\ Z_4 \\ Z_6 \\ Z_1 \\ Z_3 \\ Z_5 \\ Z_7 \end{bmatrix} = \begin{bmatrix} a & a & a & a & 0 & 0 & 0 & 0 \\ a & -a & -a & a & 0 & 0 & 0 & 0 \\ b & d & -b & -d & 0 & 0 & 0 & 0 \\ a & -b & b & -d & 0 & 0 & 0 & 0 \\ 0 & 0 & 0 & 0 & e & f & h & g \\ 0 & 0 & 0 & 0 & h & -e & g & f \\ 0 & 0 & 0 & 0 & f & -g & -e & -h \\ 0 & 0 & 0 & 0 & g & -h & f & -e \end{bmatrix} \begin{bmatrix} x_0 + x_7 \\ x_2 + x_5 \\ x_1 + x_6 \\ x_3 + x_4 \\ x_0 - x_7 \\ x_2 - x_5 \\ x_1 - x_6 \\ x_3 - x_4 \end{bmatrix} \quad (9)$$

Here,
$\alpha = \cos(\frac{1}{4})\pi$
$\beta = \cos(\frac{1}{8})\pi$
$\delta = \sin(\frac{1}{8})\pi$
$\lambda = \cos(1/16)\pi$
$\mu = \sin(3/16)\pi$
$\gamma = \cos(1/16)\pi$
$\nu = \sin(3/16)\pi$ In accordance with the formula (9), half the number of transformation coefficients is zero. It is not necessary to perform a multiplying operation with respect to the zero transformation coefficients.

In an extending processing, the inverse discrete cosine transformation is represented by the following calculating formula (10).

$$\begin{bmatrix} x_0 + x_7 \\ x_2 + x_5 \\ x_1 + x_6 \\ x_3 + x_4 \\ x_0 - x_7 \\ x_2 - x_5 \\ x_1 - x_6 \\ x_3 - x_4 \end{bmatrix} = \begin{bmatrix} a & b & a & d & 0 & 0 & 0 & 0 \\ a & -d & -a & b & 0 & 0 & 0 & 0 \\ a & d & -a & -b & 0 & 0 & 0 & 0 \\ a & -b & a & -d & 0 & 0 & 0 & 0 \\ 0 & 0 & 0 & 0 & e & f & h & g \\ 0 & 0 & 0 & 0 & h & -e & g & f \\ 0 & 0 & 0 & 0 & f & -g & -e & -h \\ 0 & 0 & 0 & 0 & g & -h & f & -e \end{bmatrix} \begin{bmatrix} Z_0 \\ Z_2 \\ Z_4 \\ Z_6 \\ Z_1 \\ Z_3 \\ Z_5 \\ Z_7 \end{bmatrix} \quad (10)$$

After the calculation of the inverse discrete cosine transformation represented by the formula (10) has been performed, an after-processing is performed such that values $(x_0+x_7)$, $(x_2+x_5)$, $(x_1+x_6)$, $(x_3+x_4)$, $(x_0-x_7)$, $(x_2-x_5)$, $(x_1-x_6)$, and $(x_3-x_4)$ are returned to $x_0, x_1, \cdots x_7$.

In FIG. 5 showing the orthogonal transformation processor in the first embodiment of the present invention, the memory device 2 is a memory device for transport composed of a RAM having N×N words. When N is equal to 8, the memory device 2 has a capacity of 64 words. The orthogonal transformation processor has N one-dimensional DCT calculators 4 and N one-dimensional DCT calculators 6. N is equal to 8 when a block as a unit of the calculation of the discrete cosine transformation is constructed by (8×8) picture elements. The address generator 8 is disposed to designate an address when the calculated results of the one-dimensional DCT calculator 4 are written to the memory device 2. The address generator 8 also designates an address for reading and transmitting the data written to the memory device 2 therefrom to the one-dimensional DCT calculator 6. If the memory device 2 has a capacity of 64 words, the address generator 8 generates an address constructed by 6 bits. Data indicative of this address are inputted to the address decoder 10 for designating an address of the memory device 2. The reading-writing control section 12 controls writing and reading operations in the memory device 2.

Figure 6:
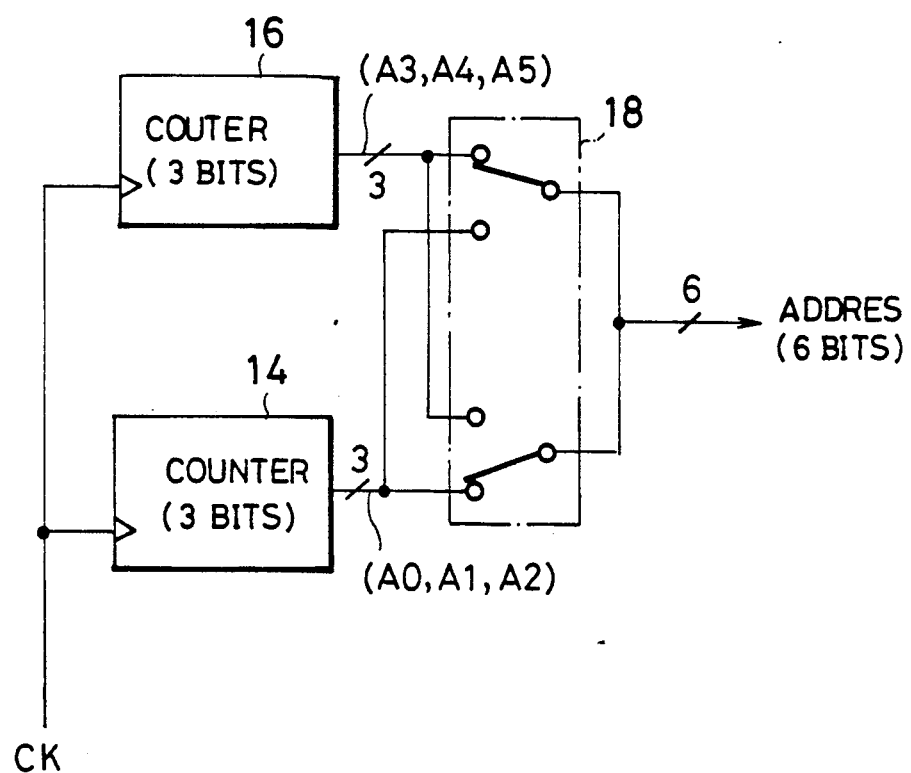
FIG. 6 is a block diagram showing one example of an address generator in the first embodiment.

FIG. 6 shows one example of the address generator 8.

The address generator 8 has two three-bit counters 14 and 16 for generating an address constructed by 6 bits. The address constructed by 6 bits is provided by combining respective three-bit outputs with each other. It is assumed that the counter 14 outputs an address constructed by three bits (A0, A1, A2) and the counter 16 outputs an address constructed by three bits (A3, A4, A5). The address constructed by 6 bits is provided by combining these addresses each constructed by three bits with each other. A switching circuit 18 switches combinations of the addresses each constructed by three bits. When this switching circuit 18 is switched on one side thereof, the addresses are set to (A0, A1, A2, A3, A4, A5). When this switching circuit 8 is switched on the other side, the addresses are set to (A3, A4, A5, A0, A1, A2). The relation between these switched addresses corresponds to a replacement of row and column addresses in the memory device 2. The switching circuit 18 is switched in association with the reading and writing operations mentioned above. At the time of the writing operation, the switching circuit 18 is switched such that the addresses are designated in the row direction. At the time of the reading operation, the switching circuit 18 is switched such that the addresses are designated in the column direction. Conversely, the switching circuit 18 may be switched at the time of the writing operation such that the addresses are designated in the column direction, and may be switched at the time of the reading operation such that the addresses are designated in the row direction.

The operation of the orthogonal transformation processor will next be described with reference to FIGS. 7 and 8.

Figures 7, 8:
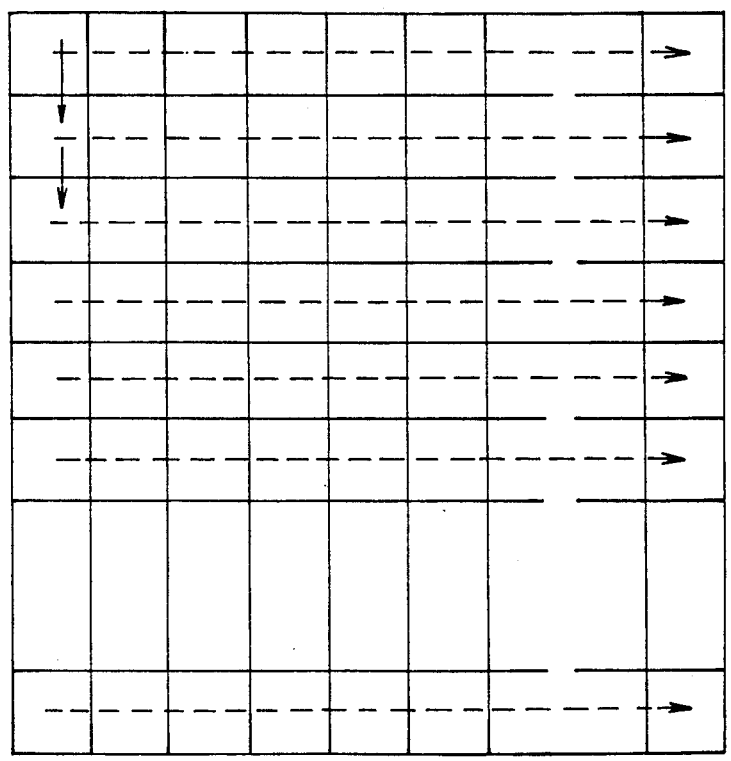
FIG. 7 is a view showing addresses of a memory device in the first embodiment.
FIG. 8 is a view showing a method for designating an address in the memory device in the first embodiment.

FIG. 7 shows addresses in the memory device 2. The addresses are provided at the time of the writing operation such that the addresses are designated in the row direction in an order (0,0), (1,0), (2,0), (3,0), --- (N−1, N−1). Thus, the calculated results provided by the one-dimensional DCT calculator 4 are written to the memory device 2 in accordance with the addresses thereof in the row direction as shown by arrows of broken lines in FIG. 8.

Next, operating modes are switched from the writing operation to the reading operation so that the switching circuit 18 of the address generator is operated to switch the row and column addresses. Thus, as shown by arrows of solid lines in FIG. 8, the addresses in the memory device 2 are designated in the column direction in an order (0,0), (0,1), (0,2), (0,3), --- (N−1,N−1). Then, data of the memory device 2 are read and transmitted therefrom to the one-dimensional DCT calculator 6.

When the reading operation is completely performed until the address (N−1,N−1), the reading operation mode is changed to the writing operation mode again so that the addresses in the memory device are again designated in the row direction, thereby repeatedly performing the calculation of the discrete cosine transformation.

The writing operation with respect to the addresses in the memory device 2 may be performed in the column direction and the reading operation with respect to the addresses in the memory device 2 may be performed in the row direction.

Figure 9:
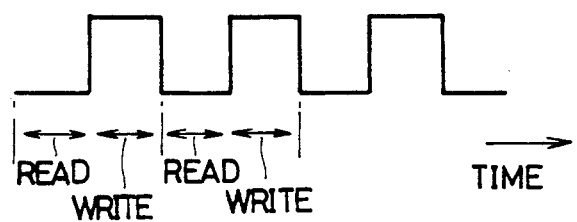
FIG. 9 is a timing chart showing the operation of a control section for reading and writing data in the first embodiment.

In another embodiment, for example, as shown in FIG. 9, in a control operation of the reading-writing control section 12, the data of a designated address are read and transmitted to the one-dimensional DCT calculator 6 at a low voltage level of a clock signal CK in one cycle thereof. Further, in the control operation of the reading-writing control section 12, the calculated results of the one-dimensional DCT calculator 4 are written to the same designated address for the period of a high voltage level of the clock signal in this cycle.

Figure 10:
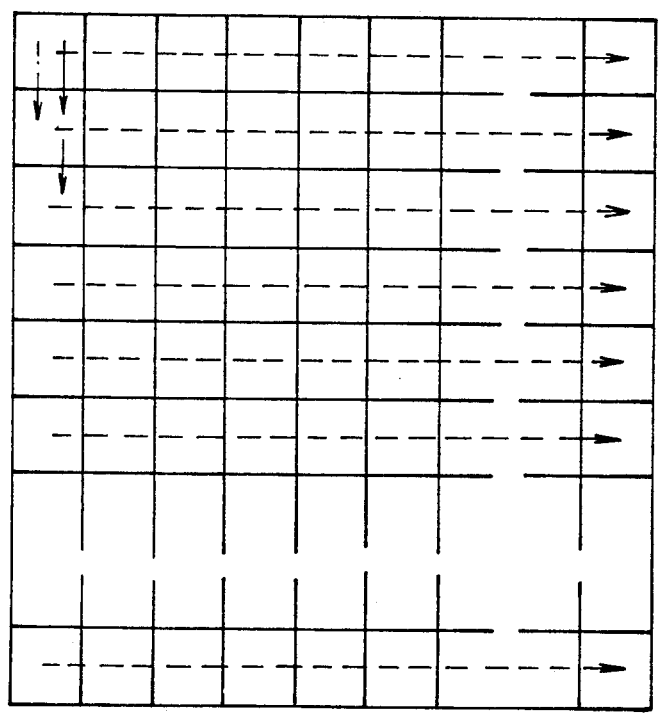
FIG. 10 is a view showing another method for designating an address in the memory device in the first embodiment.

The operation of the orthogonal transformation processor in this embodiment will next be described with reference to FIGS. 7 and 10.

For example, the addresses are first designated in the row direction in the order (0,0), (1,0), (2,0), (3,0), - - - (N−1,N−1) in FIG. 7. Thus, the calculated results provided by the one-dimensional DCT calculator 4 are written to the memory device 2 in accordance with the addresses in the row direction as shown by arrows of broken lines in FIG. 10.

Next, the switching circuit 18 of the address generator is operated to switch the row and column addresses. Thus, the addresses in the memory device 2 are designated in the order (0,0), (0,1), (0,2), (0,3), - - - (N−1,N−1) in FIG. 7. Then, data of address (0,0) are first read and transmitted to the one-dimensional DCT calculator 6. Subsequently, the calculated results of the one-dimensional DCT calculator 4 are written to the same address (0,0) as data. Next, the memory address is changed to (0,1) and the one-dimensional DCT calculator 6 reads data of this address. Subsequently, the calculated results of the one-dimensional DCT calculator 4 are written to this address (0,1) as data. In FIG. 10, the arrow in the column direction shown by a solid line shows a first reading direction and the arrow in the column direction shown by a one-dotted chain line shows a second writing direction. Such reading and writing operations are repeatedly performed until the memory address (N−1,N−1). Thereafter, the row and column addresses in the memory device are switched again. Thus, the one-dimensional DCT calculator 6 reads data out of a memory address in the row direction and the calculated results of the one-dimensional DCT calculator 4 are then written to the same address until the address (N−1,N−1).

FIG. 11 shows an orthogonal transformation processor in a second embodiment of the present invention.

In this embodiment, the orthogonal transformation processor has a pair of memory units 2a and 2b for transport composed of a RAM. A switching circuit 20 performs a switching operation to connect a one-dimensional DCT calculator 4 to one of the memory units 2a and 2b. A switching circuit 22 performs a switching operation to connect a one-dimensional DCT calculator 6 to one of the memory units 2a and 2b. Similar to the first embodiment shown in FIG. 5, the memory units 2a and 2b are connected to an address generator, an address decoder and a reading-writing control section although such a construction is not shown in FIG. 11.

The operation of the orthogonal transformation processor shown in FIG. 11 will next be described.

When the switching circuits 20 and 22 are in operating states shown in FIG. 11, the calculated results of the one-dimensional DCT calculator 4 are written to the memory unit 2a in a row direction thereof. The one-dimensional DCT calculator 6 reads the data written to the memory unit 2b in a column direction thereof. When the writing operation with respect to the memory unit 2a and the reading operation with respect to the memory unit 2b are completely performed, the switching circuits 20 and 22 are switched. Thus, the calculated results of the one-dimensional DCT calculator 4 are written to the memory unit 2b in a row direction thereof. The one-dimensional DCT calculator 6 reads the data written to the memory unit 2a in a column direction thereof. Thus, the reading operation with respect to one memory unit is simultaneously performed while the writing operation with respect to the other memory unit is performed. Such reading and writing operations are repeatedly performed while the switching operations of the switching circuits 20 and 22 are performed.

In the orthogonal transformation processor shown in FIG. 11, it is possible to perform the calculation of the two-dimensional discrete cosine transformation at a speed twice that in the orthogonal transformation processor shown in FIG. 5.

Figure 13:
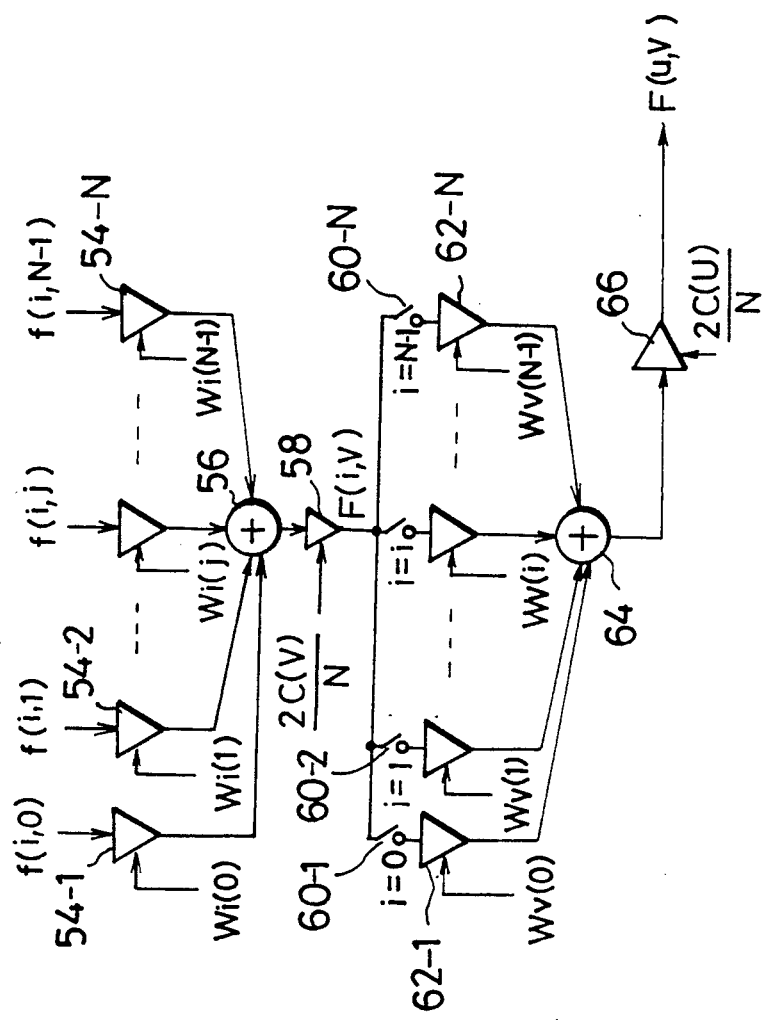
FIG. 13 is a view showing a circuit for calculating an orthogonal transformation in the orthogonal transformation processor in the second embodiment.

FIGS. 12 and 13 show a calculator for performing sequential calculations of the first and second one-dimensional discrete cosine transformations.

FIGS. 12a and 12b show the principle of this calculator.

As shown in FIG. 12a, in the calculation of the one-dimensional discrete cosine transformation in the row direction, a picture element $f(i,j)$ of an original image in an i-th cycle is multiplied by a transformation coefficient $wi(j)$ ($=\cos((2j+1)V\pi/2N)$) in the row direction. Then, the multiplied values are added to each other in the row direction and the added value is multiplied by a coefficient $2C(V)/N$. Thus, a transformation picture element $F(i,V)$ in the row direction is thus calculated. $F(i+1,V)$ is similarly calculated in an $(i+1)$-th cycle.

When the calculation of the one-dimensional discrete cosine transformation in the row direction in an N-th cycle is completed, the calculation of the one-dimensional discrete cosine transformation in the column direction is started. As shown in FIG. 12b, the transformed picture element $F(i,V)$ is multiplied by a transformation coefficient $wv(i)(=\cos((2i+1)U\pi/2N))$ in the column direction with respect to a picture element $(U, V)$. Then, the multiplied values are added to each other in the column direction. The added value is multiplied by a coefficient $2C(U)/N$ to provide a transformation picture element $F(U, V)$.

FIG. 13 shows the calculator for executing the above-mentioned operations in the second embodiment.

N multipliers 54-1 to 54-N are disposed to multiply picture elements $f(i,0)$, $f(i,1)$, - - -$f(i,N−1)$ on one line with respect to the original image by the transformation coefficient $wi(j)$ in the row direction with respect to each picture element $(U, V)$. An adder 56 adds the calculated results of the multipliers 54-1 to 54-N to each other. A multiplier 58 multiplies the added results by the coefficient $2C(V)/N$. The calculation of the one-dimensional discrete cosine transformation in the row direction is performed by such a structure.

N multipliers 62-1 to 62-N are disposed to calculate the one-dimensional discrete cosine transformation in the column direction. Selector switches 60-1 to 60-N are respectively disposed between the multiplier 58 and the multipliers 62-1 to 62-N. A selector switch corresponding to a row position i is selectively turned on so that the respective multipliers 62-1 to 62-N perform multiplying operations with respect to transformation coefficients $wv(0)$ to $wv(N-1)$. An adder 64 adds the multiplied results of the multipliers 62-1 to 62-N to each other. A multiplier 66 multiplies the added results by the coefficient $2C(U)/N$. The transformation picture element $F(U, V)$ is provided by the multiplied results.

Figure 14:
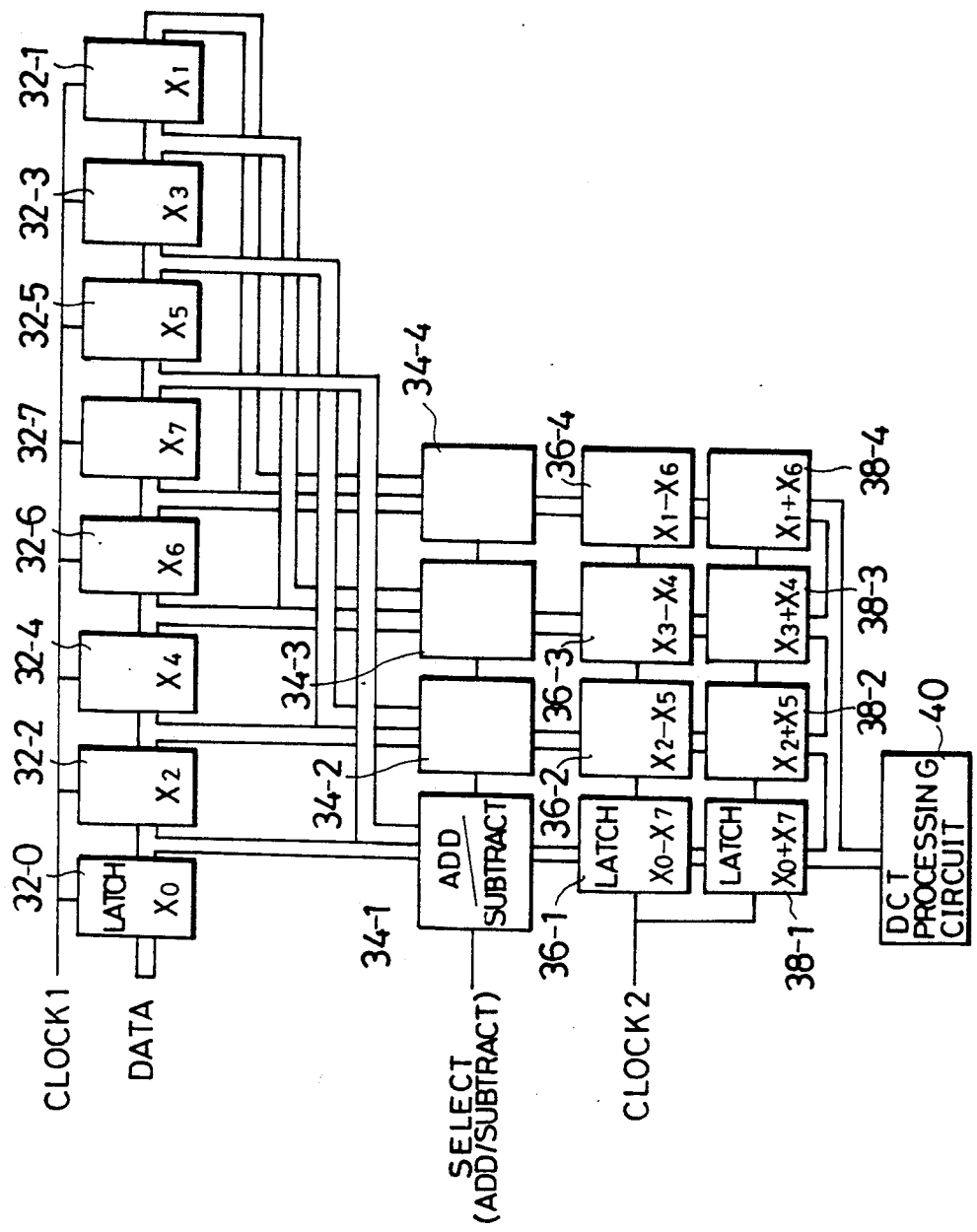
FIG. 14 is a block diagram showing a discrete cosine transformation calculator in an orthogonal transformation processor in a third embodiment of the present invention.

FIG. 14 shows an orthogonal transformation processor provided with a preprocessing circuit in a third embodiment of the present invention. FIG. 14 also shows a case in which an image is divided into blocks constructed by (8×8) picture elements to calculate the discrete cosine transformation.

Shift registers/latch circuits 32-0 to 32-7 respectively step and hold input data $x_0$ to $x_7$ at the timing of a clock signal CLOCK 1. Adding-subtracting circuits 34-1 to 34-4 input two predetermined data held by the shift registers/latch circuits 32-0 to 32-7 and perform adding and subtracting operations in accordance with a selecting signal. Shift registers/latch circuits 36-1 to 36-4 and 38-1 to 38-4 step and hold data calculated by the adding-subtracting circuits 34-1 to 34-4 at the timing of a clock signal CLOCK 2.

A DCT processing circuit 40 holds coefficients a, b, d, e, f, g and h to perform multiplying and adding operations represented by the formula (9). The DCT processing circuit 40 has a multiplier for performing the multiplying operation 32 times and an adder for performing the adding operation 31 times.

The construction of a calculator for calculating the inverse discrete cosine transformation is similar to the above construction.

The construction of a calculator for calculating the discrete sine transformation and the inverse discrete sine transformation is also similar to the above construction.

Figure 15:
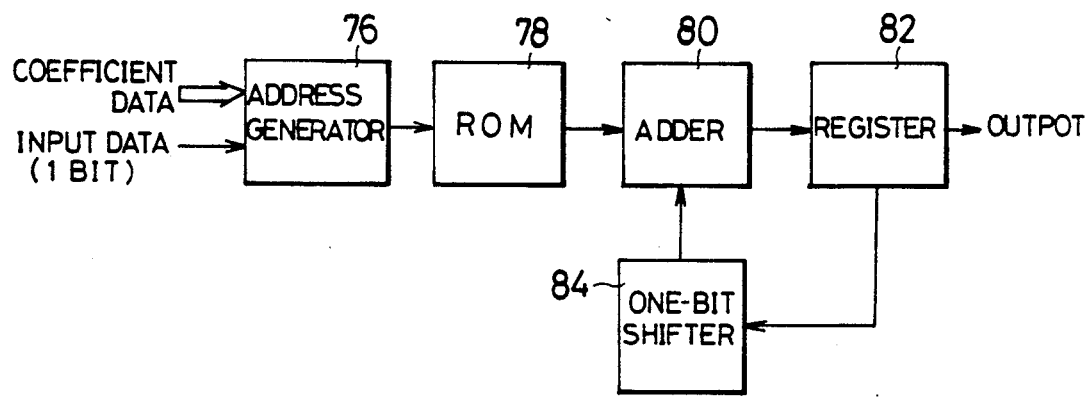
FIG. 15 is a block diagram of one multiplier used in a ROM look-up table method in an orthogonal transformation processor in a fourth embodiment of the present invention.

FIG. 15 shows a ROM look-up table circuit corresponding to one multiplying operation in the calculation of a one-dimensional discrete cosine transformation in a ROM look-up table method in an orthogonal transformation processor in a fourth embodiment of the present invention.

Transformation coefficient data constructed by plural bits and input data every one bit are inputted to an address generator 76 as an address. For example, when the number of kinds of the transformation coefficients is eight, the transformation coefficient data are three-bit data. The input data are sequentially inputted to the address generator 76 every one bit from a most significant bit or a least significant bit. A ROM 78 holds the input data. When the input data show numeral "1", the transformation coefficient data are used as an address of the ROM 78. When the input data show numeral "0", this numeral "0" is used as an address of the ROM 78. A register 82 temporarily holds data from an adder 80. A one-bit shifter 84 shifts a bit position of data held therein in the direction of an upper position when the input data are inputted from the most significant bit with respect to the data of the register 82. The one-bit shifter 84 shifts a bit position of the data held in the register 82 in the direction of a lower position when the input data are inputted from the least significant bit with respect to the data of the register 82. The adder 80 adds the data from the ROM 78 and the data shifted by one bit by the one-bit shifter 84 in the direction of the upper or lower position.

When the input data are inputted to the address generator 76 by one bit from the most significant bit, the ROM 78 is accessed such that the transformation coefficient data and the input data of the most significant bit n constituting one bit are provided as an address of the ROM 78, thereby obtaining data $D_n$. The data $D_n$ are held by the register 82 through the adder 80 and are set to an output data D. Next, the ROM 78 is accessed such that the transformation coefficient data and the input data of the (n−1)-th bit constituting one bit are provided as an address of the ROM 78, thereby outputting data $D_{n-1}$ from the ROM 78. The adder 80 adds the data $D_{n-1}$ and data shifted by one bit by the one-bit shifter 84 in the direction of the upper position to double the data D of the register 82. The added results are held by the register 82 and the output D is updated.

Such an operation is repeatedly performed until the bit of the input data becomes the least significant bit, thereby obtaining a final output D.

In this case, the capacity of the ROM 78 is shown by the number m of kinds of the transformation coefficients which is set to 8 in this example.

Figure 16:
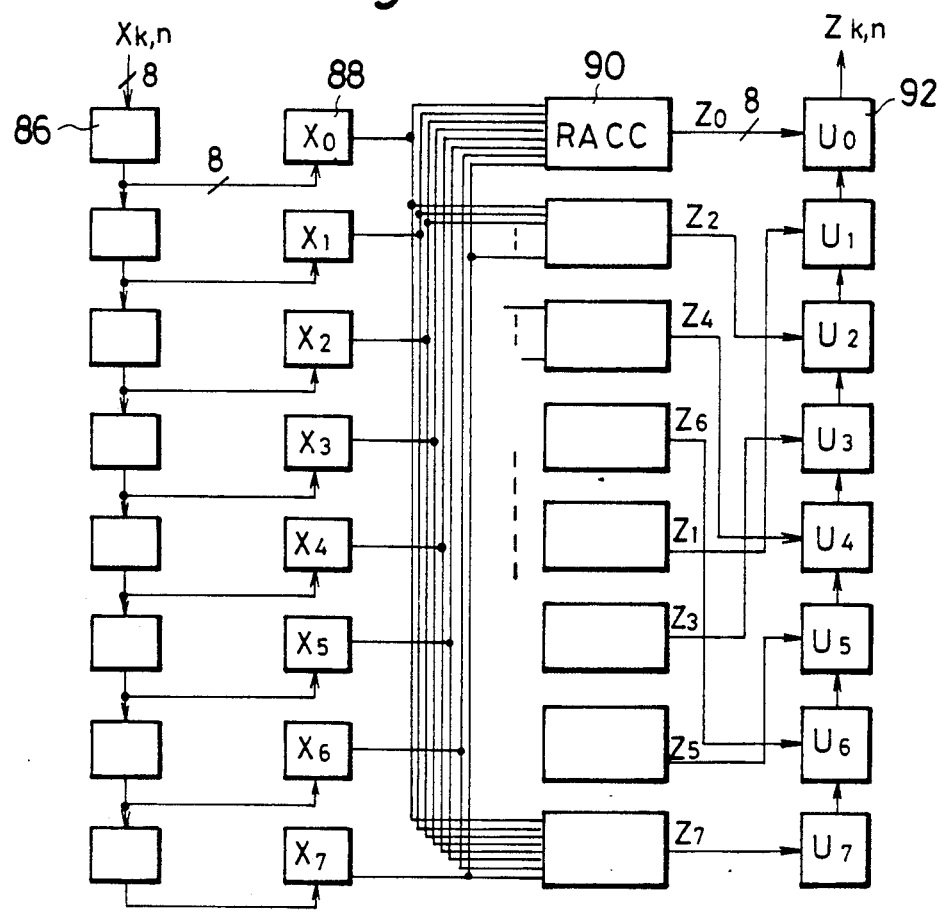
FIGS. 16 and 17 are block diagrams showing discrete cosine transformation calculators in the fourth embodiment.

FIG. 16 shows one example of a DCT processing circuit when the one-dimensional discrete cosine transformation shown by the formula (2) is calculated.

A shift register 86 receives data on one line including eight picture elements each constructed by eight bits. A latch circuit 88 holds picture elements $x_0$ to $x_7$ each constructed by eight bits. Each of DCT processing circuits 90 using the ROM look-up table method has eight circuits each shown in FIG. 5 and an adder for adding outputs of these eight circuits to each other. Input data $x_0$ to $x_7$ are sequentially inputted to each of the DCT processing circuits 90 by one bit from the most or least significant bit. Transformation coefficient data are also inputted to each of the DCT processing circuits 90 although these data are not shown in FIG. 16, thereby performing the above-mentioned calculating processings described with reference to FIG. 15. An output of each of the DCT processing circuits 90 is composed of output data $Z_0$ to $Z_7$ constructed by eight bits. A shift register 92 sequentially arranges and outputs the output data $Z_0$ to $Z_7$.

In FIG. 16, the ROM has a capacity $8 \times 2^8$ required to obtain the output data $Z_0$ to $Z_7$.

Figure 17:
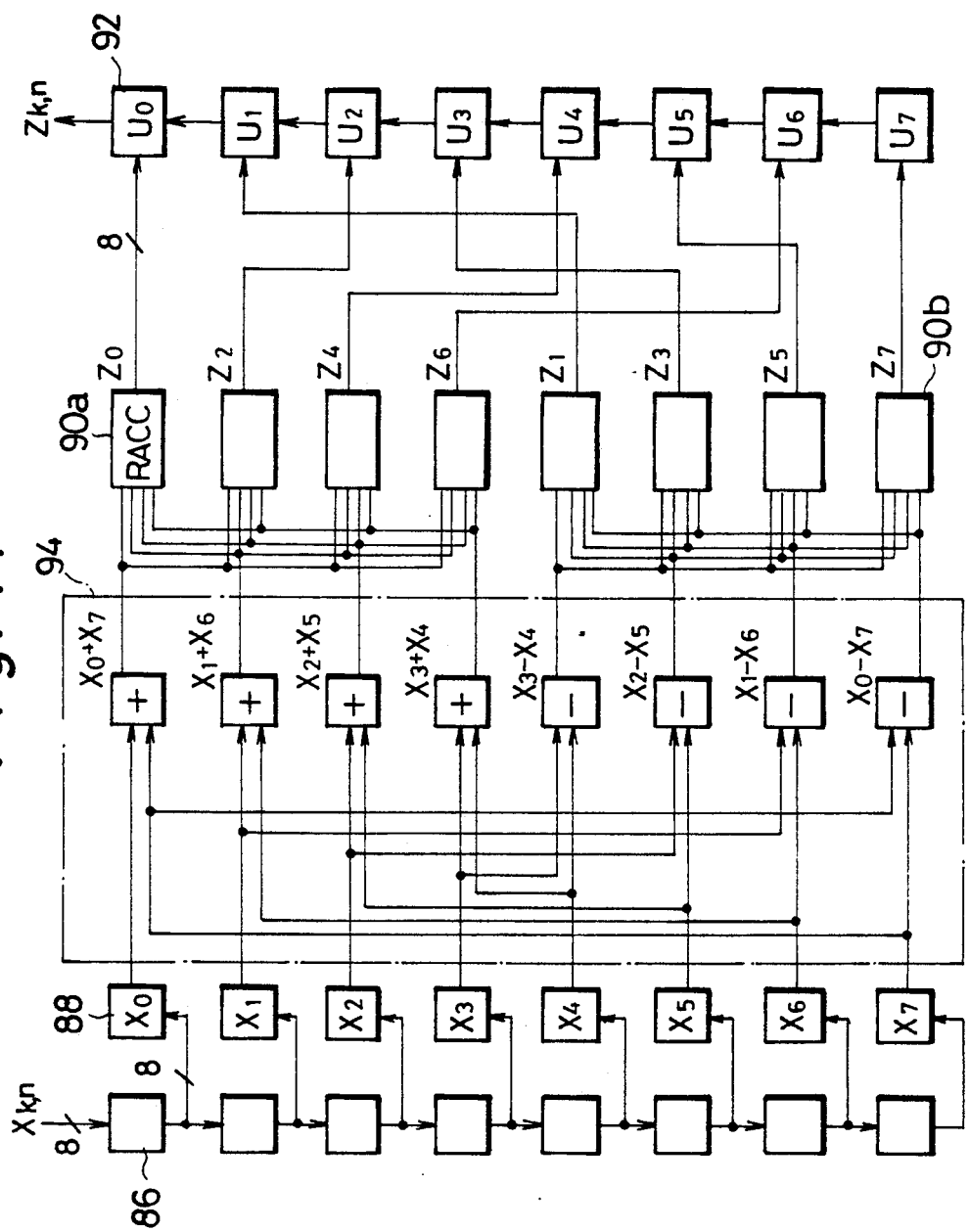

FIG. 17 shows a calculator for calculating the formula (9) using a symmetric property of the discrete cosine transformation coefficients to further reduce the capacity of a ROM table.

A preprocessing circuit 94 is disposed between a shift register 88 and DCT processing circuits 90a and 90b. A transformation coefficient matrix is deformed by the preprocessing circuit 94 as shown by the formula (9) so that half the number of transformation coefficients is set to zero. Accordingly, the latter four transformation coefficients are zero in the four DCT processing circuits 90a for providing outputs $Z_0$, $Z_2$, $Z_4$ and $Z_6$. Therefore, no input data multiplied by the zero transformation coefficients are required. Thus, input data $(x_0+x_7)$, $(x_1+x_6)$, $(x_2+x_5)$ and $(x_3+x_4)$ each constituting one bit are inputted to the four DCT processing circuits 90a as a total of four bits. The former four transformation coefficients are zero in the four DCT processing circuits 90b for providing outputs $Z_1$, $Z_3$, $Z_5$ and $Z_7$. Therefore, no input data multiplied by these zero transformation coefficients are required. Thus, input data $(x_0-x_7)$, $(x_1-x_6)$, $(x_2-x_5)$ and $(x_3-x_4)$ each constituting one bit are inputted to the four DCT processing circuits 90b as a total of four bits. Each of the DCT processing circuits 90a and 90b has four circuits each shown in FIG. 15 and an adder for adding outputs of these four circuits to each other.

In FIG. 17, the capacity of the ROM required to obtain output data $Z_0$ to $Z_7$ is reduced to $8 \times 2^4$.

For example, when a unit of the calculation of the orthogonal transformation is constructed by a block of (8×8) picture elements, it is necessary to dispose 64 multipliers in the general orthogonal transformation processor. However, in the present invention, a two-dimensional orthogonal transformation is calculated by a set of one-dimensional orthogonal transformation calculators so that it is sufficient to dispose 8+8=16 multipliers. Therefore, it is possible to simplify the structure of the orthogonal transformation processor and integrate circuits in the processor.

In a memory device for temporarily storing the calculated results of a first one-dimensional DCT calculator, data are written to the memory device in a row direction thereof and are read out of the memory device in a column direction thereof. Further, new data are written to the memory device in the column direction and are read out of the memory device in the row direction. Further, new data are written to the memory device in the row direction. When addresses in the memory device are designated and the reading and writing operations are controlled as mentioned above and the block constituting a calculating unit is constructed by (N×N) picture elements, it is sufficient to provide one block having (N×N) words with respect to a required capacity of the memory device. As a result, the memory capacity is reduced and the operation of the orthogonal transformation processor can be performed at a high speed.

When the memory device is constructed by a pair of memory units, it is possible to operate the orthogonal transformation processor at a high speed by simultaneously performing a writing operation with respect to one memory unit and a reading operation with respect to the other memory unit.

The orthogonal transformation processor may be provided with a preprocessing circuit for preprocessing input data such that the transformation coefficients are partially set to zero in the two-dimensional discrete cosine transformation or discrete sine transformation. In this case, the number of multipliers and adders in DCT or DST processing circuits is reduced so that a processing speed is increased.

Further, in accordance with the present invention, the sizes of circuits in the processor are reduced so that it is easy to integrate these circuits.

When the input data are used for an address by one bit in an orthogonal transformation processing using a ROM look-up table method, the orthogonal transformation processing can be performed with a reduced capacity of the ROM.

When the transformation coefficients are partially set to zero by the preprocessing circuit using a symmetric property of the transformation coefficients, it is possible to further reduce the capacity of the ROM.

Many widely different embodiments of the present invention may be constructed without departing from the spirit and scope of the present invention. It should be understood that the present invention is not limited to the specific embodiments described in the specification, except as defined in the appended claims.

What is claimed is:

1. An orthogonal transformation processor comprising:

a first one-dimensional orthogonal transformation calculator for calculating a one-dimensional orthogonal transforation;

a memory device for temporarily storing an output of the first one-dimensional orthogonal transformation calculator;

a second one-dimensional orthogonal transformation calculator for receiving an output of said memory device thereto, and calculating a one-dimensional orthogonal transformation; and an address generator for designating an address of said memory device and replacing row and column addresses with each other, being synchronized with writing and reading operations of said memory device wherein said memory device is constructed by a pair of memory units and the first and second one-dimensional transformation calculators are respectively connected to said memory units through switching circuits.

2. An orthogonal transformation processor as claimed in claim 1, wherein said switching circuits are switched such that the second one-dimensional orthogonal transformation calculator is connected to one of said pair of memory units when the first one-dimensional orthogonal transformation calculator is connected to the other of said pair of memory units.

3. An orthogonal transformation processor as claimed in claim 1, wherein said address generator comprises switching circuits for exchanging upper bits with lower bits of the address generator for replacing row and column address with each other.

4. An orthogonal transformation processor comprising:

a first one-dimensional orthogonal transformation calculator for calculating a one-dimensional orthogonal transformation;

a memory device constructed by a pair of memory units for temporarily storing an output of the first one-dimensional orthogonal transformation calculator;

a second one-dimensional orthogonal transformation calculator for calculating a one-dimensional orthogonal transformation and receiving an output of said memory device thereto;

wherein the first and the second one-dimensional orthogonal transformation calculators are respectively connected to said memory units through switching circuits, and said switching circuits are switched such that the second one-dimensional orthogonal transformation calculator is connected to one memory unit when the first one-dimensional orthogonal transformation calculator is connected to the other memory unit; and an address generator for designating an address of said memory device and replacing row and column addresses with each other, being synchronized with writing and reading operations of said memory device.

5. An orthogonal transformation processor as claimed in claim 4, wherein said address generator comprises switching circuits for exchanging upper bits with lower bits of the address generator for replacing row and column address with each other.

* * * * *